Patented June 7, 1938

2,120,206

UNITED STATES PATENT OFFICE 2,120,206

TREATED FUEL

Roy F. Nelson, Port Arthur, Tex., assignor to The Texas Company, New York, N. Y., a corporation of Delaware No Drawing. Application August 30, 1935, Serial No. 38,566

10 Claims. (Cl. 44—6)

This invention concerns the treatment of the surfaces of lumps or particles of coal and a coating product therefor to prevent dusting during handling or storage and to improve the appearance thereof.

The invention contemplates coating the surfaces of lumps of coal with a compound composed chiefly of petroleum oil and by-products which have the property of drying quickly to form a hard shellac-like film and which tends to make the coal less friable and less subject to breaking or disintegration.

A suitable base material which may be employed for this purpose is obtained as a by-product from the treatment of cracked petroleum vapors, in which such vapors are passed through a bed of fuller's earth, or clay, and during which certain of the unsaturated compounds contained in the vapors are polymerized and the polymers so formed are deposited in the clay or drip therefrom as a condensate.

In practising the invention a small proportion of saponifying material may be added to such polymers which may then be mixed with water to form an emulsion and preferably sprayed on the coal, or alternatively the coal may be immersed in the emulsion. The polymers remain, upon evaporation of the water, and form a shellac-like film on the surface of the coal.

It will be understood that the invention is not limited to the use of such polymers in emulsion form alone, for the treatment of coal. If desired this material may be atomized and sprayed on the coal without mixing it with water, or applied in any other suitable manner.

The base material of the coating product of this invention may be obtained from the polymers developed in the treatment of gasoline or naphtha produced in the cracking of petroleum oil in which it is the practice to pass the naphtha vapors through a bed of fuller's earth, or clay, for the purpose of removing certain unsaturated compounds which are objectionable in finished gasoline. The fuller's earth, or clay, acting apparently as a catalyst, causes polymerization of such unsaturated compounds, and the resulting polymers, which may be concentrated to a desirable degree, by subsequent fractionation, are produced as a resinous viscous liquid residue at ordinary atmospheric temperatures. In the final fractionation step for producing the resin-like polymers or base material all those fractions distilled at temperatures lower than 500° F., for example, may be discarded and those above be employed as the base material of this invention.

It has been found that such polymers adhere readily to the surfaces of lumps and particles of coal, and that moreover, this material dries quickly to form a hard shellac-like film thereon. In its quick drying properties it is vastly superior to petroleum oils (as contrasted to polymerous substance) which have been tried for treating coal, and in its water insoluble and otherwise durable properties it is unaffected by atmospheric moisture or other weather conditions.

In preparing such polymers for use in treating coal, the polymers, from which may have been separated the lighter fractions mentioned, may be mixed with a soap or any other emulsifying agent and then mixed with water to form an emulsion. Usually it is desirable to mix the water with the polymer mixture at ordinary atmospheric temperatures, and for this reason it is preferable as a preliminary step to first mix the polymers and the emulsifying agent while heating the mixture slightly and then stir in a small proportion of water while the mixture is hot. This procedure renders the mixture more readily miscible with larger proportions of water than where the materials are mixed cold.

Naphthenic acid salts or any other saponifying agent may be used with satisfactory results. For economic reasons sodium naphthenate resulting from the distillation of naphthene base crude oil or fractions thereof over caustic soda is particularly desirable as the emulsifying agent. The residue resulting from such distillation is also satisfactory. This residue, which ordinarily contains about 49% sodium naphthenate, 2% free caustic and 49% non-saponifiable matter, may be neutralized with a small proportion of hard rosin, or another suitable neutrilizing agent, and employed without separating out the excess inert material for economic reasons. Such mixture may properly be of the proportions of about 13½ pounds of residue and about 2½ pounds of hard rosin.

The emulsifying agent so produced, i. e., the complete residue plus rosin may be mixed with the polymers, while heating the mixture slightly, and thereafter, preferably before the mixture is cold, a small proportion of water may be added to make the mixture more readily miscible with the additional water. The polymer mixture may be properly made up of the proportions of about 24% polymers, 16% emulsifying or saponifying agent, and 60% of water.

The polymer mixture so produced may then be mixed with a relatively large amount of water at the coal mine or yard preparatory for use. The final mixture or emulsion may properly be made up of from 1% to 25% of the polymer mixture referred to above and 99% to 75% water. A proportion of 5% polymer mixture to 95% water is preferred. This emulsion may be sprayed on the coal, or optionally the coal may be immersed in it according to preference, the ordinary consumption being estimated at about 4 gallons of the final emulsion to one ton of coal. The coal is thereby coated with a waterproof film which prevents dusting and of itself does not scale due to weathering.

It will be understood that the proportions of ingredients above set forth are only offered as an example to illustrate one form of the invention. The invention is not limited to the particular example given.

In preparing the polymer mixture referred to the distillation residue and the hard rosin are preferably mixed, while heating, at a temperature of the order of 300° F., for the purpose of neutralizing the free alkali present in such residue and forming sodium salts of the rosin acids. While the mixture is still hot, preferably at a temperature above 200° F., the polymers may be added slowly, while stirring. The mixture may then be cooled to a point somewhat below 200° F., and the water added. The resulting mixture is readily miscible with water in any proportion, at ordinary temperatures, to form an emulsion which may be used in treating coal.

Modifications and variations of the invention, as hereinbefore set forth, may be made without departing from the spirit and scope thereof, and therefore only such limitations should be imposed as are indicated in the appended claims.

I claim:

1. A fuel comprising coal, the surface of which is coated with material applied as a water emulsion containing polymers formed during the clay treatment of cracked naphtha vapors, and a soap of naphthenic acid.

2. A base material to be emulsified with water for treating fuel to prevent dusting comprising polymers formed during the clay treatment of cracked naphtha vapors and a soap of naphthenic acid.

3. A base material to be emulsified with water for treating fuel to prevent dusting comprising polymers formed during the clay treatment of cracked naphtha vapors of the proportion of approximately 60% and an emulsifying agent of the proportion of approximately 40% and comprising essentially a soap of naphthenic acid.

4. A base material for treating comminuted fuel particles to prevent dusting comprising polymers formed during the clay treatment of cracked naphtha vapors of the proportion of approximately 24%, an emulsifying agent of the proportion of approximately 16% comprising essentially a soap of naphthenic acid and water of the proportion of 60% or more.

5. A base material for treating comminuted fuel particles to prevent dusting comprising the ingredients and proportions set forth in claim 4 in the manufacture of which the emulsifying agent comprises residue from naphthenic base crude oil distillation over caustic soda reacted with hard rosin.

6. A base material for treating comminuted fuel particles to prevent dusting comprising the ingredients and proportions set forth in claim 4 in the manufacture of which the emulsifying agent comprises approximately 13.5 parts of residue from naphthenic base crude oil distillation over caustic soda and approximately 2.5 parts hard rosin.

7. The method of forming a base material for treating solid particles of fuel which comprises mixing residue from naphthenic base crude oil distillation over caustic soda with hard rosin at a temperature of the order of 300° F., then adding to the mixture while at a temperature above 200° F. polymers formed during the clay treatment of cracked naphtha vapors, cooling the resulting mixture and finally adding water thereto.

8. In the treatment of lumps and particles of fuel to thereby render them dustless and to improve their appearance, the process of coating said lumps and particles with a water emulsion of polymers formed during the clay treatment of cracked naphtha vapors and a soap of naphthenic acid.

9. In the treatment of lumps and particles of fuel to thereby render them dustless and to improve their appearance, the process of coating said lumps and particles with a water emulsion of polymers formed during the clay treatment of cracked naphtha vapors and residue from naphthenic base mineral oil distillation over caustic soda.

10. In the treatment of lumps and particles of fuel to thereby render them dustless and to improve their appearance, the process of coating said lumps and particles with a water emulsion of polymers formed during the clay treatment of cracked naphtha vapors and residue from naphthenic base mineral oil distillation over caustic soda reacted with rosin.

ROY F. NELSON.